UNITED STATES PATENT OFFICE.

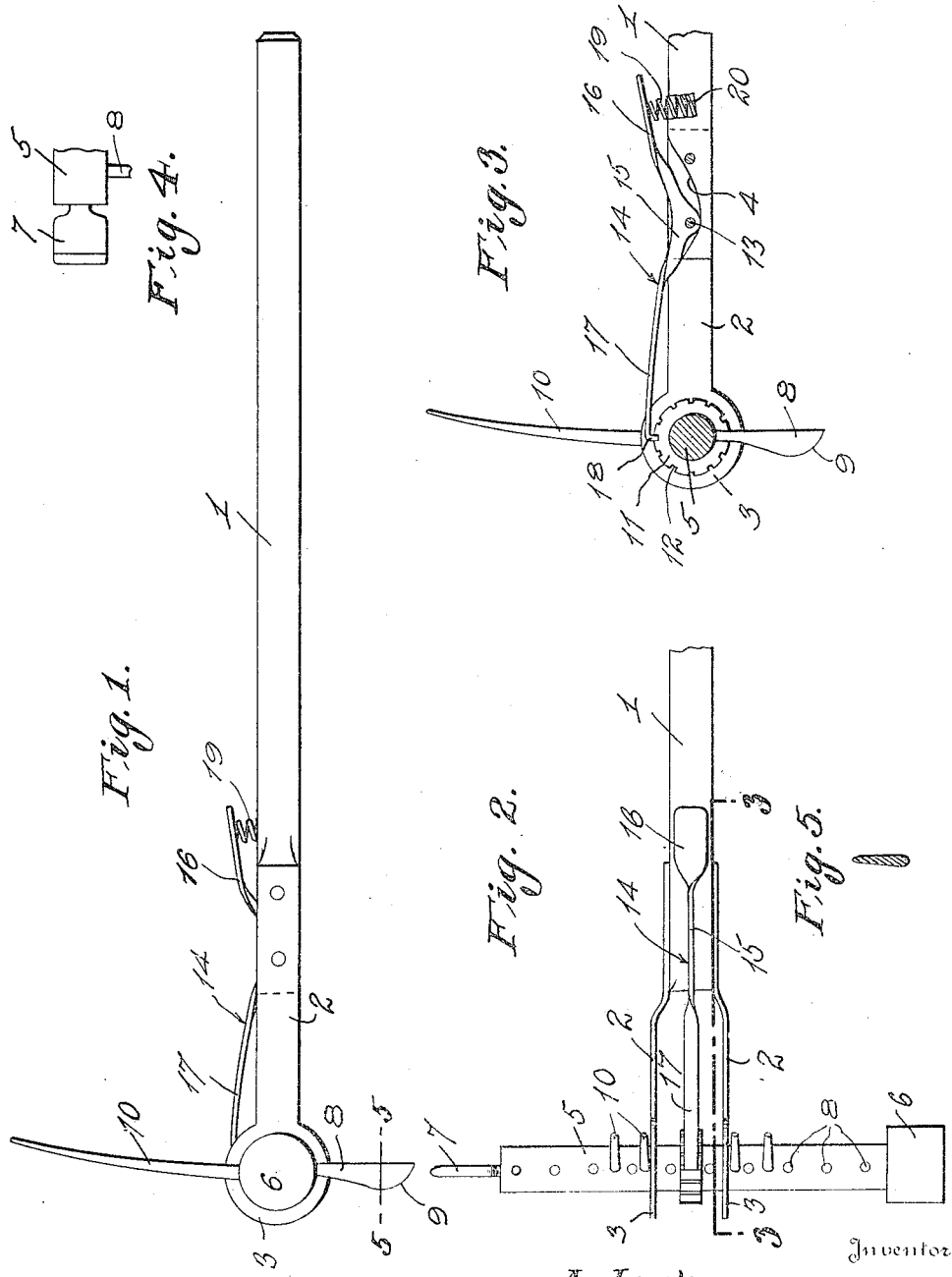

ALONZO JOSLEN, OF OKLAHOMA, OKLAHOMA.

RAKE.

1,224,551.　　　　Specification of Letters Patent.　　Patented May 1, 1917.

Application filed July 22, 1916. Serial No. 110,721.

*To all whom it may concern:*

Be it known that I, ALONZO JOSLEN, a citizen of the United States, residing at Oklahoma, in the county of Oklahoma and State of Oklahoma, have invented certain new and useful Improvements in Rakes; and I do hereby declare the following to be a full, clear, and exact description of the invention, such as will enable others skilled in the art to which it appertains to make and use the same.

This invention relates to new and useful improvements in rakes and the principal object of the invention is to provide a combination garden rake, weeder and fork which are mounted on a single handle and may be readily converted into the several different tools.

Another object of the invention is to provide a rake provided at one end with a head for use as a clod crusher.

A still further object of the invention is to provide a rake in which the teeth may be so adjusted as to slide easily over a lawn without the danger of tearing the roots of the grass. Still another object of the invention is to provide a device which may be so arranged as to be used as a cultivating fork.

With these and other objects in view, the invention consists in the novel combination and arrangement of parts which will be fully set forth in the following specification and accompanying drawing, in which:—

Figure 1 is a side view in elevation of the rake constructed in accordance with this invention and showing the teeth in operative position, Fig. 2 is a fragmentary top plan view of Fig. 1, Fig. 3 is a longitudinal sectional view on line 3—3 of Fig. 2, Fig. 4 is a detail side elevation of one end of the rake head illustrating the weeder in detail, and Fig. 5 is a horizontal sectional view on line 5—5 of Fig. 1 to illustrate the cross section of one of the teeth.

Referring to the drawing, 1 designates the rake handle having attached to its forward end a pair of forwardly extending metal strips 2 formed at their extreme forward ends with the circular enlargement constituting heads 3. These heads or enlargements 3 are provided with alined openings the use of which will appear as the description proceeds. The handle is provided near its forward end with the longitudinally extending groove 4 for holding the latch mechanism to be more fully hereinafter described.

The rake head is designated by the numeral 5 and is rotatably mounted in the head 3 as clearly shown in the drawing and one end of said rake head is provided with the enlargement or head 6 forming a clod crusher while the opposite end of the said rake head carries the weeder 7 as clearly shown in Fig. 4. Secured in the rake head 5 at spaced intervals are the rake teeth 8 which are enlarged near their lower free ends and provided with the curved portion 9 forming runners which will prevent the teeth from hooking into the roots of the grass which is being raked thereby avoiding injury to the lawn. It will be understood that the straight sides of the rake case form the active or grass engaging edges when the device is in use as a rake. It will be understood that when the curved portions 9 form the runners, the rake head is turned so that the teeth are inclined to bring the curved portion downwardly. In order that the device may be used as a fork, the tines 10 are secured in the head 5 at spaced intervals and on the side opposite that on which the teeth 8 are secured and it will thus be seen that when the device is in use as a fork, the tines will be turned downwardly thereby moving the teeth out of operative position. Secured centrally of the rake head is the ratchet wheel 11 provided with a plurality of notches 12 which are adapted to be engaged by the latch mechanism which will be more fully hereinafter described and it will thus be seen that the rake head may be held in its various adjusted positions. The latch mechanism above referred to is pivoted on the bolt 13 which forms one of the securing bolts for the strips 2 and consists of the latch designated generally by the numeral 14 which comprises a body 15 having a thumb portion 16 formed at one end, the opposite end of the body is provided with a forwardly extending tongue 17 having a downturned finger 18 at its extreme forward end which finger is adapted to engage in the notches 12 in the ratchet wheel 11 in order to hold the rake head against accidental movement. A spring 19 is seated in a recess 20 formed in the forward end of the rake handle and this spring pressing upwardly against the under side of the thumb piece 16 normally tends to move the finger 18 into engagement with the walls of the notches 12 and it will thus be seen that accidental turning of the head within the enlargement 3 is avoided and when it is desired to adjust the head, a slight pressure on the thumb piece 16 will raise the finger 18 out of engagement with the notches and thereby leave the rake head free to rotate.

While in the foregoing there has been shown and described the preferred embodiment of this invention, it is to be understood that such changes may be made in the combination and arrangement of parts as will fall within the spirit and scope of the appended claim.

What is claimed is:—

A rake comprising a handle, a pair of metal strips secured by one of their ends to the opposite side faces of the handle and projecting forwardly beyond the same, the forwardly extending ends of the strips terminating into circular enlargements provided with openings, a rake head journaled in said openings centrally of its ends, teeth carried by the head, tines carried by the side face remote from the face carrying the teeth, a ratchet secured to the shaft and located centrally between the ends of the strips, said handle provided on its upper side with a longitudinally extending groove which is located between the connected ends of the strips, a latch pivoted intermediate its ends within the groove and projecting forwardly and rearwardly beyond the walls of the same, the forward end of said latch depending downwardly for engagement with the ratchet wheel, said handle provided with a recess in its upper side adjacent the rear wall of the groove, a spring seated in said recess and having one end engaging the rear end of the latch for normally urging its forward end into engagement with the ratchet wheel for the purpose of holding the rake head in various adjusted positions.

In testimony whereof I affix my signature in presence of two witnesses.

ALONZO JOSLEN.

Witnesses:
O. R. HISEL,
D. L. PORTERFIELD.

Copies of this patent may be obtained for five cents each, by addressing the "Commissioner of Patents. Washington, D. C."